United States Patent [19]

Liebl

[11] Patent Number: 4,590,794
[45] Date of Patent: May 27, 1986

[54] LEAK DETECTOR FOR PNEUMATIC TIRE VALVE CORE

[76] Inventor: Thomas J. Liebl, R.R 1, Box 49, Donnelly, Minn. 56235

[21] Appl. No.: 717,076

[22] Filed: Mar. 28, 1985

[51] Int. Cl.⁴ .............................................. G01M 3/04
[52] U.S. Cl. .................... 73/48; 116/34 R; 340/58
[58] Field of Search .................. 73/48, 146.8, 146.5; 116/34 R; 340/58

[56] References Cited

U.S. PATENT DOCUMENTS

| | | | |
|---|---|---|---|
| 1,449,010 | 3/1923 | Lindbloom | 73/48 |
| 1,535,099 | 4/1925 | Burns | 73/48 |
| 1,846,311 | 2/1932 | Clare . | |
| 2,859,777 | 11/1958 | Brewington . | |
| 2,906,282 | 9/1959 | Shannon . | |
| 3,164,125 | 1/1965 | Stuart | 116/34 R |
| 3,185,126 | 5/1965 | Walker | 116/34 R |
| 3,452,708 | 7/1969 | Richardson | 116/34 R |
| 3,929,090 | 12/1975 | Su | 116/34 R |
| 3,938,078 | 2/1976 | Davis et al. | 340/58 |
| 4,024,829 | 5/1977 | Su | 116/34 R |
| 4,059,823 | 11/1977 | Martin et al. | 73/146.5 X |
| 4,464,929 | 8/1984 | Willis | 73/146.8 |
| 4,480,580 | 11/1984 | Nalence | 116/34 R |

*Primary Examiner*—Jerry W. Myracle
*Assistant Examiner*—Joseph W. Roskos
*Attorney, Agent, or Firm*—Dorsey & Whitney

[57] ABSTRACT

A valve stem core leak detector is provided that facilitates the repair of pneumatic tires, by indicating whether or not a tire failure is due to a malfunctioning valve stem core. The valve stem core can be tested without removal of the tire from its supporting wheel rim.

5 Claims, 3 Drawing Figures

LEAK DETECTOR FOR PNEUMATIC TIRE VALVE CORE

TECHNICAL FIELD

This invention relates to pneumatic tire leak detecting devices. In particular it relates to a device for indicating air leakage through the valve stem core of a pneumatic tire.

BACKGROUND ART

Pneumatic tires commonly comprise air tight tubes for confining fluid, such as air, within the tire. The tire tube is provided with a valve stem for introduction of air into the tube. The valve stem includes an inner core generally comprising a one way check valve.

Loss of air from an pneumatic tire's tube may occur through either a puncture in the tube, or a malfunction of the check valve in the valve stem core. Repair of a punctured tube typically requires removal of the tube from the wheel rim carrying the tire. Repair of a malfunctioning valve stem core, on the other hand, can usually be accomplished without removal of the tire tube from the rim of the wheel. Accordingly, a device which indicated leakage of air through a valve core stem would greatly facilitate the repair of pneumatic tires, by indicating whether or not the failure of the tire was due to a punctured tube or a malfunctioning valve stem core.

SUMMARY OF THE INVENTION

The valve stem core leak detector in accordance with the present invention facilitates the repair of pneumatic tires by indicating whether the failure of the tire was due to the malfunctioning valve stem core. The valve stem core can be tested without removal of the tire from its supporting wheel rim.

The valve stem core leak indicator in accordance with the present invention broadly includes an elongated, generally tubular body having an internal cavity, means for coupling the body to the valve stem to be checked, and an unbiased piston means received within the internal cavity of the body and free to shift along the entire length of the cavity. The second embodiment of the valve stem core leak detector provides a lighted, visual display when a leak from a valve stem core is detected.

DETAILED DESCRIPTION OF THE DRAWINGS

Figure 1:
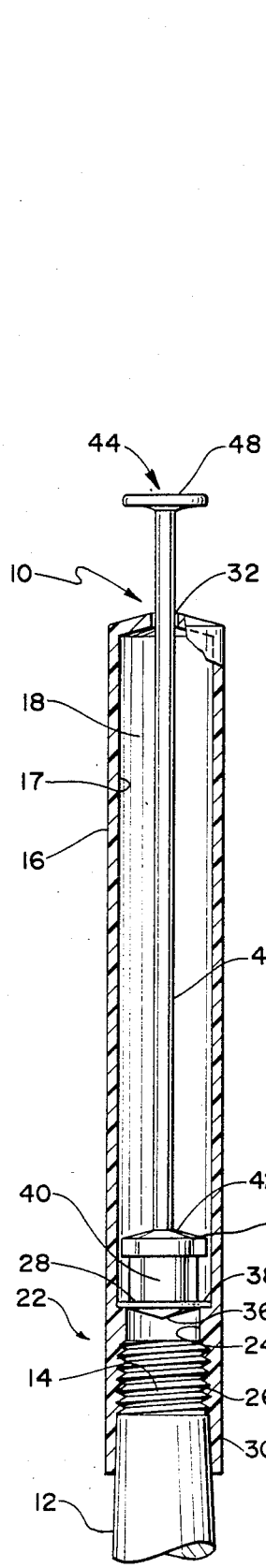
FIG. 1 a sectional view of a valve stem core leak detector in accordance with the present invention.

Referring now to the drawings, the valve stem core leak detector 10 in accordance with the present invention is depicted in conjunction with the valve stem 12 of a pneumatic tire (not shown). The valve stem 12 includes an internal core, which may include a one way check valve (not shown). The stem 12 includes an uppermost, externally threaded tip 14.

The valve stem core leak detector 10 broadly includes an elongated, generally cylindrical body 16 having an internal sidewall 17 defining an internal, generally cylindrical cavity 18. An end wall 20 is positioned at one end of the body 16, and a stem coupling portion 22 is located at the opposed end of the body 16.

The coupling portion 22 includes internal channel 24, having internally facing threads 26 along a portion thereof. The coupling portion 22 also includes annular, piston-receiving ledge 28. The ledge 28 is longitudinally spaced apart from the threads 26 of channel 24. Coupling portion 22 includes tubular apron 30 extending downwardly from the threads 26 of channel 24.

End wall 20 includes centered, indicator rod receiving aperture 32. The end wall 20 is generally frusto-conical in shape. End wall 20 defines the end of body cavity 18.

Piston 34 is shiftably received within the body cavity 18. The piston 34 is unbiased; that is, it is not urged to any particular position within the cavity 18. The piston 34 may transit the entire length of the internal body cavity 18, from the coupling portion ledge 28 to the end wall 20.

Piston 34 includes externally facing, frusto-conical bottom wall 36, wiper rim 38 received in substantially fluid tight relationship by the internal sidewall 17 of body 16, cylindrical center portion 40, and generally frusto-conical top wall 42.

A visual indicator 44 is fixably carried by the piston 34. The indicator 44 includes elongated rod 46 fixedly attached to top wall 42 of piston 34. Rod 46 extends through the internal body cavity 18 through aperture 32 in end wall 20. The rod 46 includes a disk shaped flag 48.

Figure 3:
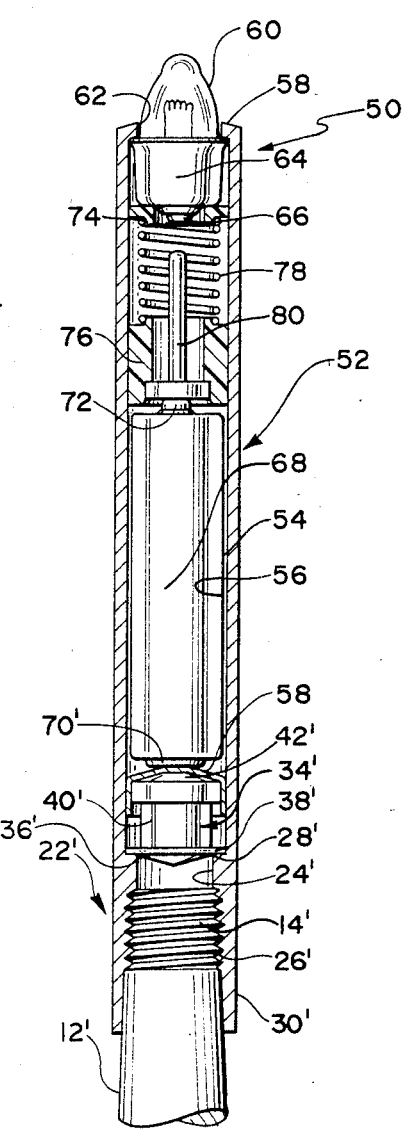
FIG. 3 is a sectional view of a second embodiment of a valve stem core leak detector in accordance with the present invention.

Referring to FIG. 3, an alternative embodiment of the valve core leak detector 50 is depicted, again in conjunction with a stem valve having a threaded external tip 14'. The detector 50 includes a generally tubular body 16' having a generally tubular body 52. Body 52 includes internal body cavity 54 defined by body sidewall 56. End wall 58 defines the upper limit of cavity 54.

The detector 50 includes a coupling portion 22' identical to that described in conjunction with the first embodiment; like numbers indicating like parts. Likewise, the detector 50 includes a piston 34' similar to that described in conjunction with the first embodiment, similar parts indicated by similar numbers. Note, however, that an electrically conducting cap element 58 is carried by the piston 34' in the second embodiment.

The indicator 50 includes a light bulb 60 received through opening 62 in end wall 58. The light bulb 60 includes first and second filament terminals 64, 66. The first filament terminal 64 is in abutting contact with the body 52. The body 52 is formed from an electrically conducting material.

Battery 68 is carried within the cavity 54. The battery includes primary and secondary battery terminals 70, 72. The primary battery terminal 70 is in electrically conducting contact with the piston cap 58, which is in turn held in sliding, electrical contact with the body inner sidewall 56.

An annular, dielectric collar 74 maintains light bulb 60 in position within end wall opening 62. Shiftable dielectric collar 76 is carried within cavity 54. Biasing spring 78 is interposed between the collars 74, 76. Electrically conducting pin 80 is carried by collar 76.

Figure 2:
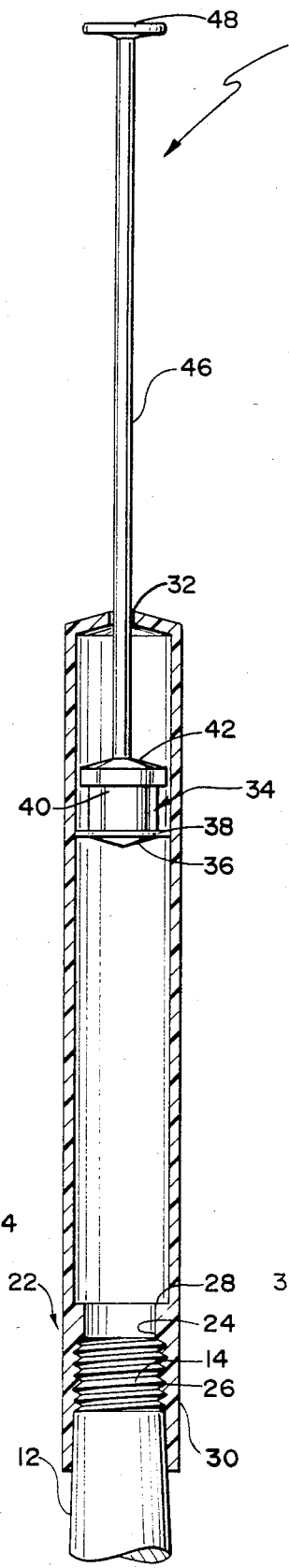
FIG. 2 is similar to FIG. 1 but with the piston in the actuated position.

In operation, the integrity of a valve stem core may be checked with the detector 10, as long as there is some residual air pressure within the tire to which stem 12 is connected to. The coupling portion 22 of the detector body 16 is threadably screwed onto the tip 14 of stem 12 such that the body 16 is connected to the stem 12 in substantially fluid tight relationship. The piston 34 is shifted to a set position, wherein the piston abuts the ledge 28 of the coupling portion 22, by depressing the indicator rod 46. The piston 34 will be shifted upwardly, to a position similar to that depicted in FIG. 2, by escaping air if there is leakage through the valve stem core. The piston 34 will remain in the set position if there is no leakage from the valve stem core, indicating that the valve stem is functioning properly.

Referring to FIG. 3, actuation of the piston 34' of the detector is similar to that described above. The piston 34' of the second embodiment, however, is biased into the set position by spring 76. Leakage of air through the core of stem 12 will shift piston 34' upwardly, causing the battery 68 to shift upwardly, together with pin 80. When the tip of electrical pin 80 is pushed into abutting relationship with the second filament terminal 66 by the upward shifting of piston 34' by leaking air pressure, an electrical circuit is completed such that the light bulb 60 will emit light.

1. An apparatus for detecting fluid leakage from a normally fluid tight valve stem core of a pneumatic tire of the like, said valve stem core haivng a stem with a generally cylindircal stem outer surface, said stem outer surface having a threaded upper poriton and an unthreaded lower portion, said apparatus comprising an elongated, generally tubular body having an internal cavity with a generally cylindrical cavity sidewall, an end wall at one end thereof, and means at the opposed end of said body for detachably, operably coupling said body to said stem, said coupling means including an internally threaded collar for matingly receiving said stem outer surface threaded upper portion and a generally tubular apron extending downwardly from said threaded collar for matingly receiving said stem outer surface lower portion in substantially fluid tight relationship for substantially leakage free fluid communication between said core and said cavity, unbiased piston means interposed between said coupling means and said end wall within said cavity, said piston means including a body portion of given axial length and a wiper rim having an axial length substantially less than said axial length of said body portion extending radially outwardly from said body portion, said wiper rim contacting said cavity sidewall in substantially fluid tight relationship and said body portion being spaced apart from said cavity sidewall, said piston means defining an expandable, fluid tight chamber within said cavity between said coupling means and said piston means, said piston means shiftable between a set position wherein said piston means abut said coupling means and a fully actuated position wherein said piston abuts said end wall, and indicator means operably connected to said piston means for visually indicating the position of said piston within said cavity.

2. An apparatus as claimed in claim 1, said end wall including structure defining a centered aperture, said indicator means comprising an elongated rod of given length fixedly coupled to said piston means and shiftably received through said aperture and projecting outwardly beyond said body whereby the position of said piston within said cavity is indicated by the length of said rod projecting outwardly beyond said body.

3. An apparatus for detecting fluid leakage from a normally fluid tight valve stem core of a pneumatic tire of the like said valve stem core having a stem with a generally cylindrical stem outer surface, said stem outer surface having a threaded upper poriton and an unthreaded lower portion, said apparatus comprising an elongated, generally tubular body having an internal cavity with a generally cylindrical cavity sidewall, an end wall at one end thereof, and means at the opposed end of said body for detachably, operably coupling said body to said stem in substantially fluid tight relationship, said coupling means including an internally threaded collar for matingly receiving said stem outer surface threaded upper portion and a generally tubular apron extending downwardly from said threaded collar for matingly receiving said stem outer surface lower portion for substantially leakage free fluid communication between said core and said cavity, piston means shiftably received within said cavity, said piston means including a body portion of given axial length and a wiper rim having an axial length substantially less than said axial length of said body portion extending radially outwardly from said body portion, said wiper rim contacting said cavity sidewall in substantially fluid tight relationship and said body portion being spaced apart from said cavity sidewall, said piston means defining an expandable, fluid tight chamber within said cavity between said coupling means and said piston means, said piston means shiftable between a set position wherein said piston means abut said coupling means and an actuated position wherein said piston means are spaced apart from said coupling means, and light emitting indicator means operably coupled to said piston means for visually indicating when said piston is in said actuated position.

4. An apparatus as claimed in claim 3, said end wall including structure defining a centered aperture, said indicator means comprising a light bulb received within said aperture, a battery carried within said cavity, and switch means operably coupling said light bulb, said battery, and said piston for electrically connecting said bulb and said battery when said piston is in said actuated position, and decoupling said bulb from said battery when said piston is in said set position.

5. An apparatus as claimed in claim 4, said light bulb including first and second filament terminals and said battery including primary and secondary terminals, said body including an electrically conducting case, said piston means including an electrically conducting element shiftably coupled to said case in electrically conducting relationship, said first filament terminal being electrically coupled to said case and said primary battery terminal being electrically coupled to said element, said switch means including biasing means interposed between said end wall and said battery for urging said battery into abutting contact with said piston and said piston into said set position, and an electrically conducting contact electrically coupled to said battery secondary terminal and shiftable into electrically conducting contact with said filament second terminal when said piston is shifted into said actuated position, whereby an electrical circuit is defined by said battery, piston conducting element, said case, said light bulb and said contact, for energizing said light bulb when said piston is in said actuated position.

* * * * *